United States Patent Office 3,766,278
Patented Oct. 16, 1973

3,766,278
CONVERSION OF HYDROCARBONS
Marcel J. P. Bogart, Whittier, Calif., and Anders Nielsen, Naerum, Jens Rostrup-Nielsen, Virum, and Johannes Wrisberg, Gammel Holte, Denmark, assignors to Haldor Frederik Axel Topsoe, Frydenlundsvej Vedbaek, Denmark, and Fluor Corporation, Los Angeles, Calif.
Filed June 9, 1971, Ser. No. 151,400
Int. Cl. C10g 37/04
U.S. Cl. 260—683 R                    10 Claims

ABSTRACT OF THE DISCLOSURE

Olefins, especially ethylene and propylene, are prepared by passing gaseous saturated hydrocarbons and/or vaporized normally liquid hydrocarbons in the presence of steam first through a catalytic reaction zone maintained at a temperature of 200–850° C. and subsequently through a thermal reaction zone maintained at a temperature of 700–950° C.; in a preferred embodiment the temperature in at least a third of the thermal reaction zone is higher than the maximum temperature in the catalytic reaction zone. By this process there is obtained an improved yield of olefins and especially of ethylene and propylene in comparison with the known conversion reactions to prepare olefins from saturated hydrocarbons.

---

Figure 1:
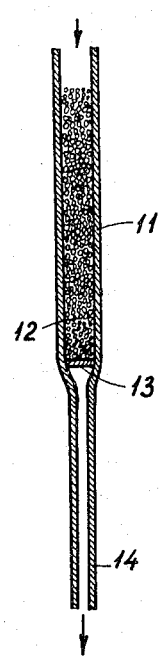

The present invention relates to a process for the manufacture of unsaturated hydrocarbons by conversion of hydrocarbons in the presence of steam. More particularly the invention relates to the manufacture of ethylene and propylene.

Ethylene and propylene are commonly manufactured by thermal cracking of gaseous or completely vaporized hydrocarbons in externally heated tubes by passing the hydrocarbons mixed with steam through the tubes at temperatures up to and even above 825° C. Large amounts of heat are required in this process and sufficient heat transfer is normally obtained in tubes having a high length to diameter ratio. However, in such processes the residence time of the products is so high that primarily-formed olefins undergo undesirable side-reactions resulting in the deleterious formation of coke and polymerization products.

Attempts have been made to operate the thermal cracking process at lower residence times. This will in most cases require higher reaction temperatures and consequently higher tube wall temperatures. The useful life of the reaction tubes, however, is much lower at higher temperatures and the resulting increase in maintenance costs cannot always be justified by the increase in yield which is a result of increase in temperature. Also the formation of coke, polymers, etc. by undesirable side reactions will be further aggravated.

It is also known to manufacture unsaturated hydrocarbons by catalytic conversion of higher hydrocarbons in the presence of steam by passing the preheated mixture of vaporized hydrocarbons and steam through a catalyst zone at a slightly elevated pressure and at temperatures from 500 to 825° C. This process can be carried out in a tubular reactor in a fluid bed reactor. In general, the catalytic conversion process does not give very much better yields of desirable products than does the conventional thermal cracking process.

We have now found that the overall yield of unsaturated hydrocarbons, particularly ethylene and propylene, manufactured by conversion of saturated hydrocarbons in the presence of steam can be significantly improved by combining a catalytic reaction zone and a thermal reaction zone either in an integrated tubular system or in separate, connected apparatuses.

According to the present invention we provide a process for the manufacture of unsaturated hydrocarbons, particularly ethylene and propylene, by conversion of higher, predominantly saturated hydrocarbons in the presence of steam in a tubular system comprising a catalytic reaction zone followed by a thermal reaction zone.

In the process according to the present invention a preheated mixture of gaseous and/or vaporized hydrocarbons, steam, and possibly other gases is introduced into the catalytic reaction zone, where it is partly reacted, and then transferred to the thermal reaction zone for further conversion. The entire process is carried out at a pressure between 0.1–50 atm. abs., preferably 1–15 atm. abs. The catalytic reaction zone is operated at temperatures between 200° C. and 850° C. whereas the thermal reaction zone is operated between 700° C. and 950° C. A significant part of the heat consuming reactions occurs in the catalytic reaction zone. Therefore, a correspondingly smaller amount of heat is required in the thermal reaction zone of this invention than in a conventional all-thermal reaction zone for completion of the conversion, with the result that the residence time of the products in the high temperature zone is lower in the process of the present invention than in the thermal cracking process of the prior art. Consequently, also the formation of undesired by-products is lower.

The residence time in the thermal reaction zone is closely related to the question of heat transfer. The rate of heat transfer will in many cases be a limiting factor which will determine the residence time and consequently the conversion. Any measure that will increase the heat transfer rate per unit reactor volume will, therefore, tend to decrease the necessary residence time, and improve the yield of desirable products.

Further, it is already known that the heat transfer rate can be increased by placing a core tube inside each reactor tube in the thermal cracking process so that the gas mixture passes through the annular space between the two tubes. In this way, the surface area for heat transfer can be increased. At the same time, the core tube will induce a certain turbulence which will further increase the rate of heat transfer. It is particularly useful in the process of the present invention to use core tubes for increasing the heat transfer rate in the thermal reaction zone. An alternative method for decreasing the residence time in the thermal reaction zone is the use of a smaller tube diameter in this zone than in the catalytic reaction zone, since this results in a higher gas velocity and consequently a higher heat transfer rate. The smaller diameter tubes of the thermal reaction zone can be connected to the larger diameter tubes of the catalytic reaction zone either by arranging each tube of the catalytic reaction zone in axial alignment with the corresponding tube of the thermal reaction zone, or by connecting each tube of the catalytic reaction zone to the corresponding tube of the thermal reaction zone through a U-bend. A group of tubes in the catalytic reaction zone can also be connected to a group of tubes in the thermal reaction zone through a manifold.

Any catalyst composition which is known to be useful in the process for catalytic conversion in the presence of steam can be employed in the catalytic reaction zone of the process of the present invention. A great number of oxides for preparing such catalyst are known. Some examples are oxides of zirconium, hafnium, aluminum, thorium, alkaline earth metals, alkali metals, silicon, titanium, copper, nickel, iron, cobalt, antimony, rare earth metals, chromium, and silver. These oxides are known as being suitable for preparing catalyst either alone or more often in combination with one or more of the others.

Particularly suitable catalysts are described in the specifications to copending applications Nos. 99,237 and 99,271, filed on Dec. 17, 1970, by Johanes Wrisberg, Kjeld Jørn Andersen and Erik Mogensen. The catalyst of the first mentioned of these comprises zirconia prepared from a raw material of which at least part is amorphous zirconium oxide, together with 0.1–10% by weight of an alkali metal compound, calculated as oxide. The catalyst of the second of the said references comprises a major proportion and at least one oxide of zirconium and hafnium, together with at least 5 wt. percent of active alumina as well as at least 5 wt. percent of at least one oxide of chromium, manganese or iron, and a small amount not exceeding 10 wt. percent of at least one compound of an alkali metal or alkaline earth metal.

The disclosure of the two copending applications mentioned may serve for further elucidation of a catalyst suitable for use in the catalytic reaction zone of the present application. It should be emphasized, however, that the present invention is in no way limited to the use of the catalysts disclosed in the said copending applications.

The hydrocarbon feed for the process may be a single saturated hydrocarbon, or it may be a mixture substantially comprising saturated hydrocarbons. The presence of a certain amount of unsaturated hydrocarbons may be allowed and may even be preferable since olefins in the feed may favorably influence the yield of desirable products. Suitable hydrocarbons and hydrocarbon mixtures include ethane, propane, and butane as well as liquid hydrocarbons such as various fractions of low and high boiling naphthas and gas oils. The presence of sulphur compounds can be tolerated and may even be desirable since the sulphur will passivate the free metal surface of the reactor and thereby reduce the risk of excessive reaction between steam and hydrocarbon resulting in the formation of hydrogen and unwanted carbon oxides. The sulphur may be originally present in the feedstock or it may be added as a gaseous or liquid sulphur compound. Other gases may also be added to the feed, either completely inactive gases which only serve to dilute the reactants and products, or gases which may to some extent influence the desirable reactions. Examples of such gases are: methane, carbon dioxide, oxygen, oxygen enriched air, atmospheric air, hydrogen, and nitrogen. The amount of added gas may vary widely depending on the process conditions, among which is the composition of the catalyst.

The necessary heat for the endothermic reactions occurring in the catalytic reaction zone and the thermal reaction zone is generally supplied through the tube walls. The two zones can for instance be arranged in a radiant furnace. A wall-fired box-type furnace is particularly suitable since in such a furnace the two zones can be heated independently by proper arrangement and regulation of the wall burners. Furthermore, this arrangement provides a flexibility in design which is useful since the fraction of the total heat supplied to each of the two zones can be varied considerably without deviating from the scope of the present invention. While in some cases the two zones may require about equal parts of the total heat supply, either of them may in extreme cases require as little as 10 percent or as much as 90 percent of the total heat supply. Accordingly, the size and volume of the two zones will vary considerably from case to case.

The apparatus for the process of the present invention usually consists of a plurality of parallel tubes extended vertically in a furnace. The number of tubes in the thermal reaction zone is preferably equal to or lower than the number of tubes in the catalytic reaction zone. The process gas is introduced into the tubes in the catalytic reaction zone either through one manifold connection to all of the tubes or through more manifolds each connected to a group of tubes. From the tubes in the catalytic reaction zone the process gas is transferred to the tubes in the thermal reaction zone. In one embodiment of the process each of the tubes in the catalytic reaction zone is connected to one particular tube in the thermal reaction zone, each of the tubes in the thermal zone accordingly being connected with one tube in the catalytic reaction zone so that the number of tubes in the two zones are identical. The connection may be straight, so that tubes in series are axially aligned; or the connection may be via a U-bend.

In another embodiment of the process a group of tubes in the catalytic reaction zone is connected to a group of tubes in the thermal reaction zone through a manifold. In this case, the number of tubes in the latter zone may be preferably equal to or lower than the number of tubes in the former zone. Up to about ten tubes in the catalytic reaction zone may in this way be connected to ten or less than ten tubes in the thermal reaction zone. For example, five tubes in the catalytic reaction zone can be connected to five or three tubes in the thermal reaction zone.

In both embodiments of the process of the present invention the direction of gas flow may be the same or different in two zones, i.e. the catalytic reaction zone and the thermal reaction zone. It is preferable, however, to have a downward flow in the catalytic reaction zone, while in the thermal reaction zone the flow direction may be downwards or upwards. In the catalytic reaction zone the tubular reactor has a length to a diameter ratio from 100 to 1, preferably from 50 to 10, the inner diameter being from 10 to 500 mm., preferably from 50 to 250 mm. In the thermal reaction zone the tubular reactor has a length to diameter ratio from 200 to 20 and an inner diameter from 10 to 500 mm.—preferably from 50 to 250 mm. The diameter of the core tube, if this is used in the thermal reaction zone, is related to the innner diameter of the tubular reactor in this zone so that the annular space has a width from 1 to 50 mm. However, the optimum width varies from case to case, since it depends on several factors among which are linear velocity and temperature of the gas passing through the annular space.

In the drawing, FIGS. 1–4 show in longitudinal section diagrammatically four different arrangements of the tubes in the catalytic reaction zone relative to the tubes of the thermal reaction zone, for use in the process of the present invention. It should be noted that each of the two zones in a commercial plant will normally contain a plurality of tubes but for the sake of clarity, the number of tubes has been reduced to one in FIGS. 1–3, and to a small number in FIG. 4. In the commercial plant, the tubes in the thermal reaction zone will normally be connected in parallel, and so will the tubes in the catalytic reaction zone. The tubes may be made of any material conventionally used for such tubes, for instance a suitable grade of steel.

In each of the figures, the direction of flow at the inlet and the outlet of tubes is shown by arrows. In the figures, wall thickness is exaggerated in comparison with other dimensions.

As shown in FIG. 1, a tube 11 containing a catalyst 12, placed as a fixed bed on a grid 13, constitutes the catalytic reaction zone. Tube 11 is connected to a narrower tube 14 constituting the thermal reaction zone. If the inner diameter of tube 14 is sufficiently small, grid 13 may be omitted, the catalyst bed then being supported on the "shoulder" forming the transition from tube 11 to tube 14. Tubes 11 and 14 are placed, together with other similar tubes, in a suitable furnace not shown. The same applies to the embodiments shown in the other figures. The flow of gases is downwards. Means for supplying the hydrocarbon feedstock and for removing the converted gases, notably ethylene and propylene, are not shown but may be conventional.

Figure 2:
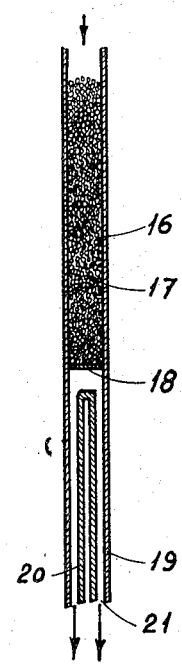

The arrangement shown in FIG. 2 resembles that of FIG. 1; it contains a tube 16 containing catalyst 17 supported on grid 18, tube 16 constituting the catalytic reaction zone. In this embodiment, however, the thermal reaction zone is constituted by a tube 19 having largely the same diameter as tube 16, but containing a core tube 20 so that the effective space in thermal reaction zone is the narrow annular space 21.

Figure 3:
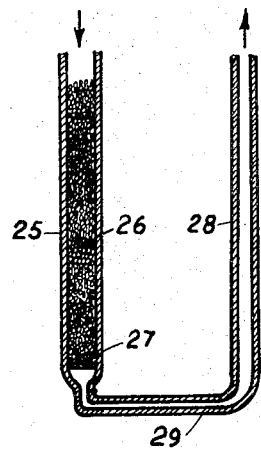

In the embodiment shown in FIG. 3, the catalytic reaction zone is similar to that shown in FIGS. 1 and 2; it comprises tube 25 containing catalyst 26 supported on grid 27. The flow of gases is downward. In this case, however, the flow of gases is upwards in the thermal reaction zone which is constituted by a narrow tube (like tube 14 in FIG. 1) connected to tube 25 via a U-bend 29. Tube 28 in the embodiment of FIG. 3 might be replaced by a larger diameter tube containing a core tube, similar to the embodiment of the thermal reaction zone shown in FIG. 2.

Figure 4A:
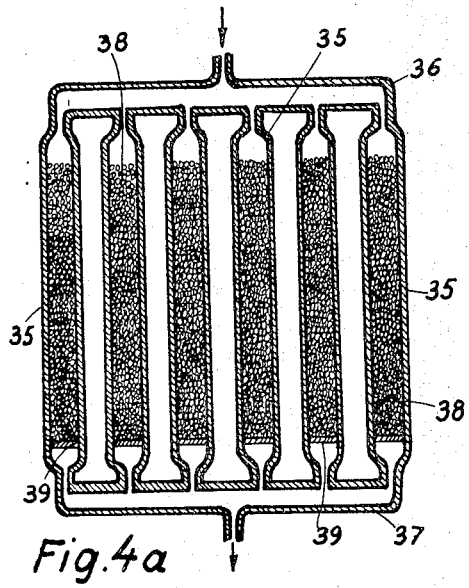
Figure 4B:
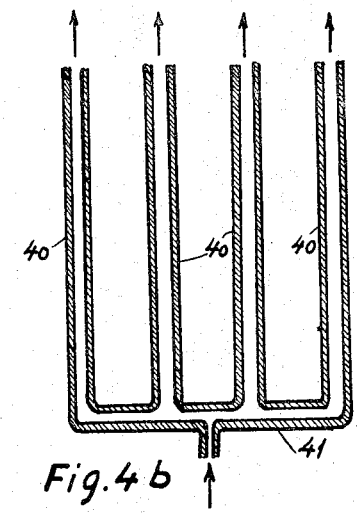

In the embodiment illustrated in FIG. 4, the catalytic reaction zone (FIG. 4a) is constituted by six tubes 35 grouped together by means of an inlet manifold 36 and an outlet manifold 37; the six tubes 35 each contain a bed of catalyst 38 supported on grids 39. The process gas formed in tubes 35 is conducted from outlet manifold 37 via a transfer line (not shown) to the thermal reaction zone shown in FIG. 4b; this zone comprises four tubes 40 grouped together by means of a manifold 41. The flow is downwards in the catalytic reaction zone and upwards in the thermal reaction zone; it might also be downwards in the thermal reaction zone, in which case the manifold 41 would be placed in the upper end.

The two groups of tubes shown in FIGS. 4a and 4b, respectively, may be arranged in various manners, for instance in such a manner that the tubes in the two zones are in two parallel rows.

As in FIG. 1, the grids (18, 27, 39) in FIGS. 2, 3 and 4 may be omitted if the particles of the catalyst are large enough to be supported on the top of the core tube (FIG. 2) or the "shoulders" formed by the narrowing of the tubes.

The main advantages of the process of the present invention over the hitherto known catalytic conversion process and thermal cracking process is an improved yield of ethylene and propylene.

It has been possible in each of the two zones to optimize the conditions with respect to residence time and temperature and thereby to achieve a high total conversion to desirable products. Another advantage of the new process over the prior art processes is the lower consumption of compression energy per unit volume of ethylene in the product separation and fractionating stage because of the higher ratio of ethylene to total gas.

In general a wide variety of primary products are obtained in processes for the manufacture of olefins. Some of these are not end-product olefins, but through further processing these may be converted into more valuable olefins. Ethane and, if present, also propane are isolated from the products and subjected to a conversion process for production of further olefins. The acetylenes, such as acetylene, $C_2H_2$, and methylacetylene, $C_3H_4$, as well as the lower di-enes such as propadiene, $C_3H_4$, are selectively hydrogenated into the corresponding olefins. These additional yields of olefins which are obtained through further processing are added to the primary yields for calculation of the "ultimate yields" as weight of product per 100 weights of hydrocarbon feedstock in accordance with the following equations:

"Ultimate yield" of $C_2H_4$ = wt. percent
$C_2H_4$ + 0.82 × wt. percent $C_2H_6$ + 1.07 × wt. percent $C_2H_2$ + 0.43 × wt. percent $C_3H_8$ "Ultimate yield" of $C_3H_6$ = wt. percent $C_3H_6$ + 1.05 wt. percent $C_3H_4$ + 0.17 × wt. percent $C_3H_8$ The conversion factors in the above equations indicate the approximate yields of useful olefins that can be obtained during the further processing per weight unit of the original less useful products: ethane, propane, acetylene, propadiene, and methyl acetylene, respectively.

Ethylene is the main product in most processes for the manufacture of olefins. Propylene is an important by-product for which there is a varying demand. The ratio of propylene to ethylene is the "Cracking index" defined as follows:

"Cracking index"
$$= \frac{\text{"Ultimate yield" of } C_3H_6, \text{ wt. percent}}{\text{"Ultimate yield" of } C_2H_4, \text{ wt. percent}}$$

Butylenes and butadiene are in some cases desirable by-products for which there is a certain demand. However, it is generally important to maximize the yield of ethylene since this is the product for which there is the greatest demand. In the comparison of yields from two different processes for the manufacture of ethylene and propylene it is important that these yields have been obtained at about the same "Cracking index." It has now been found that for a given "Cracking index" the "ultimate yield" of ethylene is higher in the process of the present invention than in either a catalytic conversion process or a thermal cracking process.

It is an important feature of the process of the present invention that the "Cracking index" can be varied in accordance with the varying demand for propylene. The propylene yield can for instance be controlled by proper selection of catalyst type or type of hydrocarbon feed and will, furthermore, vary with process conditions. It is a particular feature of the process that the operating conditions for the catalytic reaction zone and for the thermal reaction zone can be independently selected so that a greater flexibility can be achieved than in either a catalytic conversion process or a thermal cracking process.

In order that the invention should be better understood, it will now be described in further detail in the following examples:

EXAMPLE 1

The hydrocarbon feed was a full range naphtha having a specific gravity of 0.70 and a final boiling point of 170° C. 135 kg./h. of this naphtha, containing 200 parts per million of sulphur, was vaporized and heated to 300° C. in a heater and then mixed with an equal weight of steam. This mixture was further heated to 450° C. before it was introduced into a pilot plant consisting of a tubular reaction system as illustrated in FIG. 2, having the following dimensions—

Catalytic reaction zone:
  Length of zone: 3.0 m.
  Inner diameter: 90 mm.
Thermal reaction zone:
  Length of zone: 3.0 m.
  Inner diameter: 90 mm.
  Core tube outer diameter: 60 mm.

The pilot plant only consisted of one tube in each of the two zones, said tubes having almost the size required for an industrial plant (which would contain several tubes in each unit).

The catalyst used in the catalytic reaction zone was in the form of hollow cylindrical rings, inner diameter 6 mm., outer diameter 13 mm., and height 13 mm. This catalyst was prepared as described below. 19 l. of the catalyst was placed in the catalytic reaction zone. The pressure was 4.9 atm. abs. at the inlet of the catalyst zone. The temperature of the process gas was gradually increased while it passed through the catalyst bed from 450° C. at the inlet to 775° C. at the outlet. In the thermal reaction zone, the temperature was further increased to 850° C. at the outlet. The composition of the dry product gas is shown in Table I. This composition represents the maximum yield obtained during a 25 hours' experiment. The argon appearing in the product gas was added to the steam hydrocarbon feed for facilitating the analytical work. It is of no significance for and has no influence on the reactions.

The catalyst employed in the catalyst reaction zone was prepared in the following manner:

100 kg. of an aqueous zirconyl carbonate paste was dried for 16 hours at 120° C. This resulting zirconyl carbonate powder was mixed in the dry state with 6 wt. percent potassium stearate, tabletted, and calcined at 850° C. for two hours. The final catalyst contained 1.0 wt. percent $K_2O$.

TABLE I

|  | Vol. percent on dry gas | Wt. percent related to naphtha feed |
|---|---|---|
| $H_2$ | 15.00 | 1.15 |
| CO | 0 | 0 |
| $CO_2$ | 0.33 | 0.55 |
| $CH_4$ | 23.13 | 14.12 |
| $C_2H_2$ | 1.1 | 1.09 |
| $C_2H_4$ | 31.12 | 33.21 |
| $C_2H_6$ | 2.81 | 3.21 |
| $C_3H_4$ | 0.55 | 0.84 |
| $C_3H_6$ | 11.24 | 17.99 |
| $C_3H_8$ | 0.27 | 0.45 |
| $C_4H_6$ | 2.34 | 4.81 |
| $C_4H_8$ | 1.50 | 3.20 |
| $C_5H_{12}$ | 1.61 | 4.42 |
| Ar | 5.04 | |
| Balance | 3.96 | 1.02 |
| Liquid product | | 13.94 |

The "Ultimate yields" of ethylene and propylene and the "Cracking index" for this example are shown in Table II. For comparison this table also gives data for a catalytic conversion process and a thermal cracking process both operated at about the same "Cracking index" as the example.

TABLE II

|  | Example process of invention | Catalytic conversion process | Thermal cracking process |
|---|---|---|---|
| "Ultimate yield" of ethylene, wt. percent | 37.20 | 34.8 | 32.4 |
| "Ultimate yield" of propylene, wt. percent | 18.94 | 16.5 | 16.5 |
| "Ultimate yield" of butadiene, wt. percent | 4.81 | 3.9 | 4.8 |
| "Ultimate yield" of butenes, wt. percent | 3.20 | 4.0 | 3.6 |
| Total olefins, wt. percent | 64.15 | 59.2 | 57.3 |
| "Cracking index" | 0.51 | 0.48 | 0.51 |

Thus, Table II shows that there is obtained an improved yield of ethylene and propylene in comparison with those obtained by the known processes for preparing these olefins.

EXAMPLE 2

This example was carried out in a similar apparatus as Example 1 except that the dimensions of the reaction tubes were as follows—

Catalytic reaction zone:
  Length of zone: 3.0 m.
  Inner diameter: 75 mm.
Thermal reaction zone:
  Length of zone: 3.0 m.
  Inner diameter: 75 mm.
  Core tube outer diameter: 60 mm.

Other differences were that volume of catalyst was 13 l., naphtha feed rate was 45.5 kg./h., temperature in catalyst zone was from 490° C. at inlet to 810° C. at outlet, the temperature was further increased to 826° C. in the thermal reaction zone.

An example of composition of dry product gas obtained during a 35 hours' experiment is shown in Table III. The average values of "Ultimate yields" and "Cracking index" during this experiment are shown in Table IV, where also data for a thermal cracking process operated at the same "Cracking index" are given.

TABLE III

|  | Vol. percent on dry gas | Wt. percent related to naptha feed |
|---|---|---|
| $H_2$ | 15.43 | 1.23 |
| CO | 0.12 | 0.13 |
| $CO_2$ | 0.49 | 0.85 |
| $CH_4$ | 25.26 | 16.04 |
| $C_2H_2$ | 0.13 | 0.13 |
| $C_2H_4$ | 31.74 | 35.23 |
| $C_2H_6$ | 2.46 | 2.93 |
| $C_3H_4$ | 0.08 | 0.13 |
| $C_3H_6$ | 8.85 | 14.74 |
| $C_3H_8$ | 0.19 | 0.33 |
| $C_4H_6$ | 2.23 | 4.77 |
| $C_4H_8$ | 1.37 | 3.05 |
| $C_5H_{12}$ | 0.62 | 1.77 |
| Ar | 6.77 | |
| Balance | 4.26 | 4.10 |
| Liquid product | | 14.57 |

TABLE IV

|  | Example process of invention | Thermal cracking process |
|---|---|---|
| "Ultimate yield" of ethylene, wt. percent | 38.32 | 34.7 |
| "Ultimate yield" of propylene, wt. percent | 14.43 | 13.1 |
| "Ultimate yield" of butadiene, wt. percent | 4.64 | 4.5 |
| "Ulrimate yield" of butenes, wt. percent | 2.69 | 2.6 |
| Total olefins, wt. percent | 60.08 | 54.9 |
| "Cracking index" | 0.377 | 0.377 |

Table IV also shows that the yield of ethylene and propylene are improved over that obtained by the known thermal cracking process.

We claim:

1. In a process for preparing olefins by the conversion of a feedstock selected from the group consisting of normally gaseous saturated hydrocarbons having at least 2 carbon atoms per molecule and vaporized normally liquid hydrocarbons in the presence of steam, the improvement which consists of the steps of passing a mixture of said feedstock and steam through a catalytic reaction zone for the initial conversion of part of the feedstock to olefins in the presence of a catalyst suitable for such conversion and then directly into a subsequent thermal reaction zone, for further conversion of the feedstock to olefins in the absence of a catalyst, the temperature in said catalytic reaction zone being maintained between 200° C. and 850° C., the temperature in said thermal reaction zone being maintained between 700° C. and 950° C., and the pressure in both said catalytic reaction zone and said thermal reaction zone being maintained at 0.1–50 atm. absolute.

2. The process according to claim 1, wherein 10–90% of the total heat energy supplied to the process is supplied to the catalytic reaction zone and the remainder to the thermal reaction zone.

3. The process according to claim 1, wherein the catalytic reaction zone is constituted of a plurality of parallel tubes and the thermal reaction zone is at most the same number of parallel tubes, all of said tubes being contained in a reactor.

4. The process according to claim 3, wherein said mixture of hydrocarbon feedstock and steam is divided into a number of streams which are passed through the same number of tubes constituting the catalytic reaction zone and passed directly from there to the same number of the tubes constituting the thermal reaction zone.

5. The process according to claim 3, wherein the mixture of said hydrocarbon feedstock and steam is first conducted through a group of tubes in the catalytic reaction zone and then directly via a manifold to a group of tubes in said thermal reaction zone, the number of tubes in the latter group being at most the same as the number of tubes in the former group.

6. The process according to claim 5, wherein the number of tubes in the said group of the catalytic reaction is from 2 to 10.

7. In a process for preparing olefins by the conversion of feedstock selected from the group consisting of normally gaseous saturated hydrocarbons and vaporized normally liquid hydrocarbons having at least 2 carbon atoms per molecule in the presence of steam, the improvement which consists of the steps of passing a mixture of said feedstock and steam through a catalytic reaction zone for the initial conversion of part of the feedstock to olefins in the presence of a catalyst suitable for such conversion and then directly into a subsequent thermal reaction zone for further conversion of the feedstock to olefins in the absence of a catalyst, the temperature in said catalytic reaction zone being maintained between 200° C. and 850° C., the temperature in said thermal reaction zone being maintained between 700° C. and 950° C., the temperature in at least a third of said thermal reaction zone being higher than the maximum temperature in said catalytic reaction zone, and the pressure in both said catalytic reaction zone and said thermal reaction zone being maintained at 0.1–50 atm. absolute.

8. In a process for preparing ethylene and propylene by the conversion of a feedstock selected from the group consisting of normally liquid hydrocarbons having at least 2 carbon atoms per molecule, the improvement which consists of the steps of passing a mixture of said feedstock and steam through a catalytic reaction zone for the initial conversion of part of the feedstock to olefins in the presence of a catalyst suitable for such conversion and then directly into a subsequent thermal reaction zone for further conversion of the feedstock to olefins in the absence of a catalyst, the pressure in both of said zones being maintained at 0.1–50 atm. absolute, the temperature in said catalytic reaction zone being maintained between 200° C. and 850° C., the temperature in said thermal reaction zone being maintained between 700° C. and 950° C.

9. The process according to claim 8, wherein ethane and propane obtained in the product gas are isolated and recycled to the process for conversion into ethylene and propylene.

10. In a process for preparing ethylene and propylene by the conversion of a feedstock selected from the group consisting of normally gaseous saturated hydrocarbons and vaporized normally liquid hydrocarbons having at least 2 carbon atoms per molecule, the improvement which consists of the steps of passing a mixture of said feedstock and steam through a catalytic reaction zone for the initial conversion of the part of the feedstock to olefins in the presence of a catalyst suitable for such conversion and then directly into a subsequent thermal reaction zone for further conversion of the feedstock to olefins in the absence of a catalyst, the pressure in both of said zones being maintained at 0.1–50 atm. absolute, the temperature in said catalytic reaction zone being maintained between 200° C. and 850° C., the temperature in said thermal reaction zone being maintained between 700° C. and 950° C., and the temperature in at least a third of said thermal reaction zone being higher than the maximum temperature in said catalytic reaction zone.

References Cited
UNITED STATES PATENTS

| | | | |
|---|---|---|---|
| 2,327,099 | 8/1943 | Eastman | 208—73 |
| 2,331,930 | 10/1943 | Pier et al. | 208—73 |
| 2,889,384 | 6/1959 | Woolcock | 260—683 |

DELBERT E. GANTZ, Primary Examiner

C. E. SPRESSER, Jr., Assistant Examiner

U.S. Cl. X.R.

208—73, 75, 130